(12) United States Patent
Cohen et al.

(10) Patent No.: US 7,203,852 B2
(45) Date of Patent: Apr. 10, 2007

(54) SYSTEM AND PROCESS FOR MAKING POWER READILY AVAILABLE TO NEWLY ADDED COMPUTERS

(75) Inventors: Paul M. Cohen, Beaverton, OR (US); Christopher A. Meredith, Beaverton, OR (US); Ronald J. Child, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 09/893,981

(22) Filed: Jun. 29, 2001

(65) Prior Publication Data

US 2003/0005339 A1 Jan. 2, 2003

(51) Int. Cl.
*G06F 1/32* (2006.01)
*G06F 11/30* (2006.01)
*H04Q 7/20* (2006.01)

(52) U.S. Cl. .................. 713/320; 713/340; 455/522

(58) Field of Classification Search ............... 713/320, 713/340, 330; 700/295; 455/522
See application file for complete search history.

(56) References Cited

U.S. PATENT DOCUMENTS 4,677,566 A * 6/1987 Whittaker et al. .......... 700/295
5,200,708 A * 4/1993 Morris et al. ............ 330/124 R
5,283,905 A * 2/1994 Saadeh et al. ............... 713/324
5,483,656 A * 1/1996 Oprescu et al. ............. 713/320
6,301,674 B1 * 10/2001 Saito et al. .................. 713/340
6,477,388 B1 * 11/2002 Schmutz ..................... 455/522
6,526,516 B1 * 2/2003 Ishikawa et al. ............ 713/340
6,594,771 B1 * 7/2003 Koerber et al. ............. 713/330

\* cited by examiner

*Primary Examiner*—Thomas Lee
*Assistant Examiner*—Suresh K Suryawanshi
(74) *Attorney, Agent, or Firm*—Kenyon & Kenyon LLP

(57) ABSTRACT

A system for and a process of controlling power supplied to a group of computers. The power available is determined, and the total power requirement of the group of computers is monitored. When an additional computer joins the group, the new total power requirement is determined. If this exceeds the power available, but the existing group of computers can operate with reduced power and the additional computer can operate with less power than indicated in the request for power, reduced power is provided to each computer of the existing group of computers, and the additional computer is provided with less power than indicated in the request for power. When the existing group of computers or the additional computer can not operate with this reduced power, the total power requirement of the existing plurality of computers is continued to be provided, and only standby power is provided to the additional computer.

15 Claims, 1 Drawing Sheet

SYSTEM AND PROCESS FOR MAKING POWER READILY AVAILABLE TO NEWLY ADDED COMPUTERS

FIELD

The present invention pertains to a process of controlling power supplied to a group of computers in a computer system, and to a computer system including a power controller for controlling power provided to the computers of the system.

BACKGROUND

Many computer systems provide power from a common power supply to the computers of the system. The power supply has a maximum power capacity. If an additional computer is added to the system, that increases the power requirements of the system. If the new power requirements exceed the maximum power capacity of the power supply, the entire system might shut down. Not only is that undesirable, but in critical circumstances it can lead to catastrophic results. While Universal Serial Bus (USB) may protect a single computer when new peripheral components are added, no protection exists for a computer system when another computer is added to the system.

BRIEF DESCRIPTION OF THE DRAWINGS

The present invention will be described with reference to the accompanying drawings which illustrate preferred embodiments of the invention. In the drawings.

DETAILED DESCRIPTION

Figure 1:
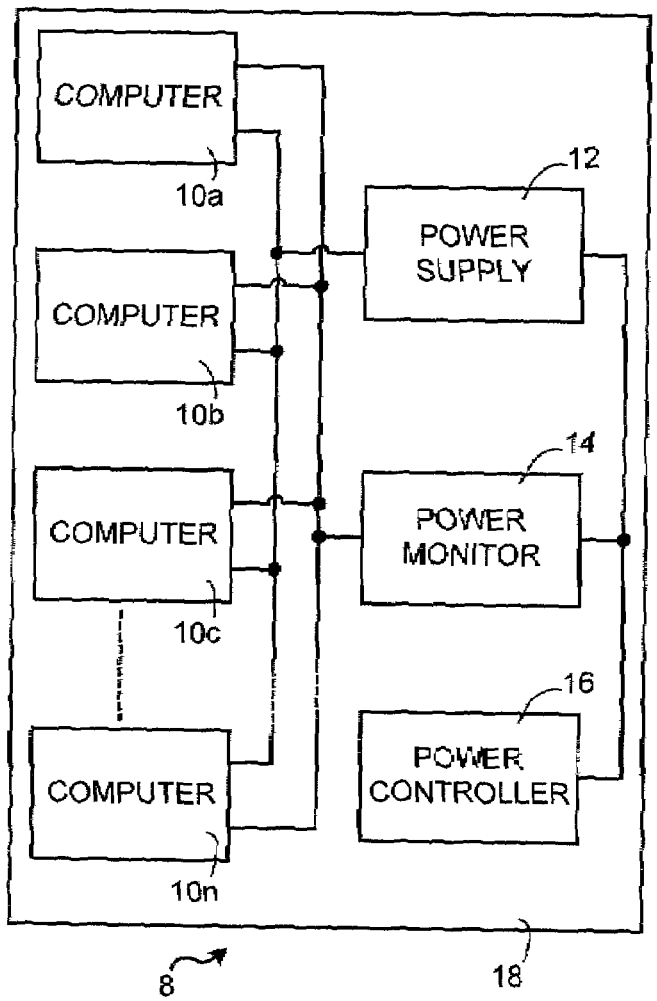
FIG. 1 is a block diagram of a computer system in accordance with a preferred embodiment of the present invention.

FIG. 1 depicts a computer system 8 in accordance with a preferred embodiment of the present invention. Computer system 8 includes a plurality of computers 10a, 10b, 10c, . . . 10n each of which receives power from a common power supply 12. One of the computers 10a–10n may be a server. A power monitor 14 determines the power available from power supply 12 and monitors the power requirements of the several computers 10a–10n. A power controller 16 controls the power supplied from power supply 12 to the computers 10a–10n based on the power requirements of the individual computers and the available power from supply 12. Power monitor 14 and power controller 16 might be a properly programmed digital processing system, for example. Computer system 10, including computers 10a–10n, power supply 12, power monitor 14, and power controller 16, might be contained within a rack 18, such as a bladed rack, permitting ready addition and removal of computers.

Figure 2:
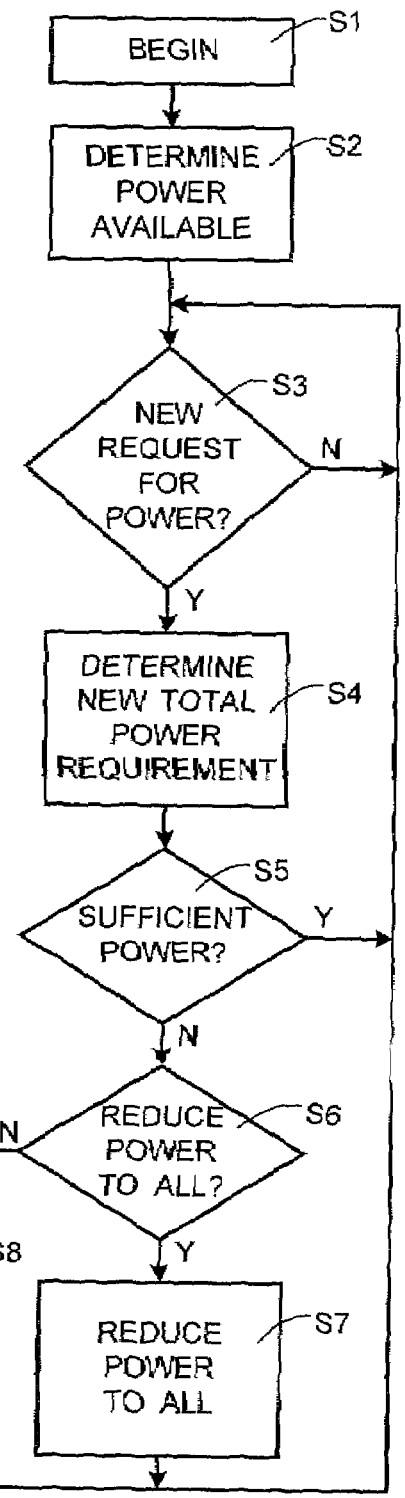
FIG. 2 is a flowchart of a process of controlling power supplied to a group of computers in a computer system in accordance with a preferred embodiment of the present invention.

FIG. 2 is a flowchart of a process of controlling power supplied to the computers of a computer system such as computer system 8 in accordance with a preferred embodiment of the present invention. The process begins in step S1. In step S2 power monitor 14 determines the amount of power available from power supply 12. In many computer systems this value is substantially constant and so can be stored within a memory in power controller 16. In step S3, power controller 16 determines whether there has been a new request for power. Such a new request for power might result from an additional computer being added to the group of computers 10a–10n. If there is no new request for power, the process waits in step S3. A new request for power results in a new total power requirement. When a new request for power is detected in step S3, then in step S4, power monitor 14 determines the level of that new total power requirement. In step S5, power controller 16 determines whether the available power as determined in step S2 is sufficient to satisfy the new total power requirement. If so, then the process returns to step S3. If step S5 determines that power supply 12 can not provide sufficient power to satisfy the new power requirement, then in step S6 power controller 16 determines whether the power provided to the computers 10a–10n, including the new computer, can be reduced, with all of the computers operating at a reduced capacity, for example receiving 75% of their respective usual power requirements. If so, then in step S7, the power is reduced to all of the computers, including providing the additional computer less power than indicated in its request for power. The process then returns to step S3. If step S6 determines that the power to be supplied to all of the computers 10a–10n, including the new computer, can not be reduced, then power controller 16 does not change the level of power supplied to the original computers, but does not allow the new computer to operate, instead providing only standby power to the new computer, for example only 2–3% of its usual power requirement. The process then returns to step S3.

The present invention thus provides control of power in a computer system, making power readily available to newly added computers when sufficient power is available, while assuring that an existing computer of the system is not made inactive due to a loss of power when an attempt is made to add another computer to the system. Although the present invention has been described with reference to preferred embodiments, various alternations, rearrangements, and substitutions can be made, and still the result will be within the scope of the invention.

The invention claimed is:

1. A computer system, comprising:
   a plurality of computers, each computer having a power requirement;
   a power supply to supply power to said plurality of computers, said power supply having a known power capacity;
   a power monitor to monitor the total power requirement of said plurality of computers; and
   a power controller responsive to a request for power from an additional computer, resulting in a new total power requirement, to determine whether the new total power requirement exceeds the known power capacity, and responsive to the new total power requirement exceeding the known power capacity to cause said power supply to reduce the power supplied by said power supply to each computer of said plurality of computers and to provide said additional computer with less power than indicated in the request for power.

2. A computer system as claimed in claim 1, wherein one of said computers is a server.

3. A computer system as claimed in claim 1, further comprising a computer rack having said plurality of computers, said power supply, said power monitor, and said power controller therein.

4. A computer system, comprising:
a plurality of computers, each computer having a power requirement;
a power supply to supply power to said plurality of computers, said power supply having a known power capacity;
a power monitor to monitor the total power requirement of said plurality of computers; and
a power controller responsive to a request for power from an additional computer, resulting in a new total power requirement, to determine whether the new total power requirement exceeds the known power capacity, and responsive to the new total power requirement exceeding the known power capacity to cause said power supply to continue to provide the total power requirement of said plurality of computers and to provide only standby power to said additional computer.

5. A computer system as claimed in claim 4, wherein one of said computers is a server.

6. A computer system as claimed in claim 4, further comprising a computer rack having said plurality of computers, said power supply, said power monitor, and said power controller therein.

7. A computer system, comprising:
a plurality of computers, each computer having a power requirement;
a power supply to supply power to said plurality of computers, said power supply having a known power capacity;
a power monitor to monitor the total power requirement of said plurality of computers; and
a power controller responsive to a request for power from an additional computer, resulting in a new total power requirement, to determine whether the new total power requirement exceeds the known power capacity, responsive to the new total power requirement exceeding the known power capacity to determine whether said plurality of computers can operate with reduced power and said additional computer can operate with less power than indicated in the request for power, responsive to said plurality of computers being able to operate with reduced power and said additional computer being able to operate with less power than indicated in the request for power to cause said power supply to reduce the power supplied by said power supply to each computer of said plurality of computers and to provide said additional computer with less power than indicated in the request for power, and responsive to said plurality of computers not being able to operate with reduced power or to said additional computer not being able to operate with less power than indicated in the request for power to cause said power supply to continue to provide the total power requirement of said plurality of computers and to provide only standby power to said additional computer.

8. A computer system as claimed in claim 7, wherein one of said computers is a server.

9. A computer system as claimed in claim 7, further comprising a computer rack having said plurality of computers, said power supply, said power monitor, and said power controller therein.

10. A process of controlling power supplied to a plurality of computers, said process comprising:
determining the power available;
monitoring the total power requirement of a plurality of computers;
in response to detection of a request for power from an additional computer, determining a new total power requirement; and
if the power available is less than the new total power requirement, reducing the power supplied to each computer of the plurality of computers and providing the additional computer with less power than indicated in the request for power.

11. A process of controlling power supplied to a plurality of computers, said process comprising:
determining the power available;
monitoring the total power requirement of a plurality of computers;
in response to detection of a request for power from an additional computer, determining the new total power requirement; and
if the power available is less than the new total power requirement, continuing to provide the total power requirement of the plurality of computers and providing only standby power to the additional computer.

12. A process of controlling power supplied to a plurality of computers, said process comprising:
determining the power available;
monitoring the total power requirement of a plurality of computers;
in response to detection of a request for power from an additional computer, determining the new total power requirement;
if the power available is less than the new total power requirement, determining whether the plurality of computers can operate with reduced power and whether the additional computer can operate with less power than indicated in the request for power;
if each computer of the plurality of computers can operate with reduced power and the additional computer can operate with less power than indicated in the request for power, providing reduced power to each computer of the plurality of computers and providing the additional computer with less power than indicated in the request for power; and
if at least one computer of the plurality of computers can not operate with reduced power or the additional computer can not operate with less power than indicated in the request for power, continuing to provide the total power requirement of the plurality of computers, and providing only standby power to the additional computers.

13. An article, comprising a storage medium having computer-executable instructions stored thereon, the instructions when executed controlling power supplied to a plurality of computers by determining the power available; monitoring the total power requirement of a plurality of computers; in response to detection of a request for power from an additional computer, determining a new total power requirement; and if the power available is less than the new total power requirement, reducing the power supplied to each computer of the plurality of computers and providing the additional computer with less power than indicated in the request for power.

14. An article, comprising a storage medium having computer-executable instructions stored thereon, the instructions when executed controlling power supplied to a plurality of computers by determining the power available; monitoring the total power requirement of a plurality of computers; in response to detection of a request for power from an additional computer, determining the new total power requirement; and if the power available is less than the new total power requirement, continuing to provide the total power requirement of the plurality of computers and providing only standby power to the additional computer.

15. An article, comprising a storage medium having computer-executable instructions stored thereon, the instructions when executed controlling power supplied to a plurality of computers by determining the power available; monitoring the total power requirement of a plurality of computers; in response to detection of a request for power from an additional computer, determining the new total power requirement; if the power available is less than the new total power requirement, determining whether each computer of the plurality of computers can operate with reduced power and whether the additional computer can operate with less power than indicated in the request for power; if each computer of the plurality of computers can operate with reduced power and the additional computer can operate with less power than indicated in the request for power, providing reduced power to each computer of the plurality of computers and providing the additional computer with less power than indicated in the request for power; and if at least one computer of the plurality of computers can not operate with reduced power or the additional computer can not operate with less power than indicated in the request for power, continuing to provide the total power requirement of the plurality of computers, and providing only standby power to the additional computers.

* * * * *